July 4, 1944.  G. M. BOOTH ET AL  2,352,767
DIFFUSER-CIRCULATOR
Filed April 2, 1941  2 Sheets-Sheet 2

George M. Booth
Mitchell H. Cubberley
INVENTORS

BY
Cooper, Kerr & Dunham
ATTORNEYS

Patented July 4, 1944

2,352,767

UNITED STATES PATENT OFFICE 2,352,767

DIFFUSER-CIRCULATOR

George Martin Booth, Westfield, and Mitchell Horace Cubberley, Belleville, N. J., assignors to Wallace & Tiernan Co. Inc., Belleville, N. J., a corporation of New York Application April 2, 1941, Serial No. 386,434

12 Claims. (Cl. 261—93)

This invention relates to the treatment of liquids with gases and more particularly relates to means for introducing or diffusing a gas into a body of liquid, an important application of the invention being in the treatment of relatively large bodies of liquid wherein it is desired not only to diffuse the gas but also to provide a circulation of the liquid for other treatment or reaction purposes. One example of various chemical processes wherein provision should be made both for gas diffusion into a liquid and for circulation of the gas-treated liquid, is in chlorination treatment of iron for the production of ferrous or ferric chloride. Such procedure usually involves the use of a water-filled tank partially or substantially loaded with scrap iron, and the water in the tank is subjected to chlorine treatment for reaction to produce the desired iron chloride solution. In order to recirculate the water and thereby accelerate the reaction with the iron, a frequently used but relatively cumbersome system has included a pump with the necessary piping to draw solution from one end of the tank and return it to the other, the chlorine gas being introduced into the recirculation system, say at any convenient point; in this way, an attempt is made to secure adequate contact between the liquid and the scrap iron.

An important object of the invention is to provide simplified, efficient and practical arrangements for the introduction of gas into a liquid and for effecting circulation of or within the liquid. Another object is to provide rugged, reliable and easily controlled apparatus of the character described, for effecting thorough diffusion of the gas into the liquid; and also to provide such apparatus which automatically and with the same instrumentalities, affords circulation of the treated body of liquid, particularly by continuous displacement of portions of liquid as they are treated with the gas.

A further object is to provide an improved diffusing and circulating device of unitary structure and preferably of such nature that for use it may be readily inserted or otherwise applied in (and removed from) almost any sort of tank, conduit or other vessel, without extensive structural modifications or accoutrements.

Other objects of the invention include the provision of arrangements of the character described wherein the gas is introduced into the liquid under a vacuum (i. e., under a reduced pressure), so that, for instance, the device may serve as the primary vacuum producing means for operation of vacuum actuated gas flow control apparatus, e. g., apparatus wherein the gas is fed by means of a vacuum applied to the gas output side of the apparatus and in accordance with flow control arrangements in the apparatus.

To these and other ends, a presently satisfactory embodiment of the invention is illustrated by way of example, in the accompanying drawings; and since it finds special utility in procedures such as the chlorination of iron solution, specific reference to such treatments will be made, for purposes of illustration, in the following description.

Referring to the drawings.

For treatments of the described sort it is preferable that submerged parts of the device be made of or covered with suitable corrosion-resistant material—e. g., in the case of chlorine application, hard rubber or other material unaffected by chlorine or chlorine solutions. It will be understood, of course, that the apparatus may be constructed of various materials and may be susceptible of use in non-corrosive conditions or conditions of different corrosive effect; but by way of example, the illustrated structure will be described as adapted to handle substances of somewhat corrosive effect, such as chlorine and chlorinated liquids.

Figure 1:
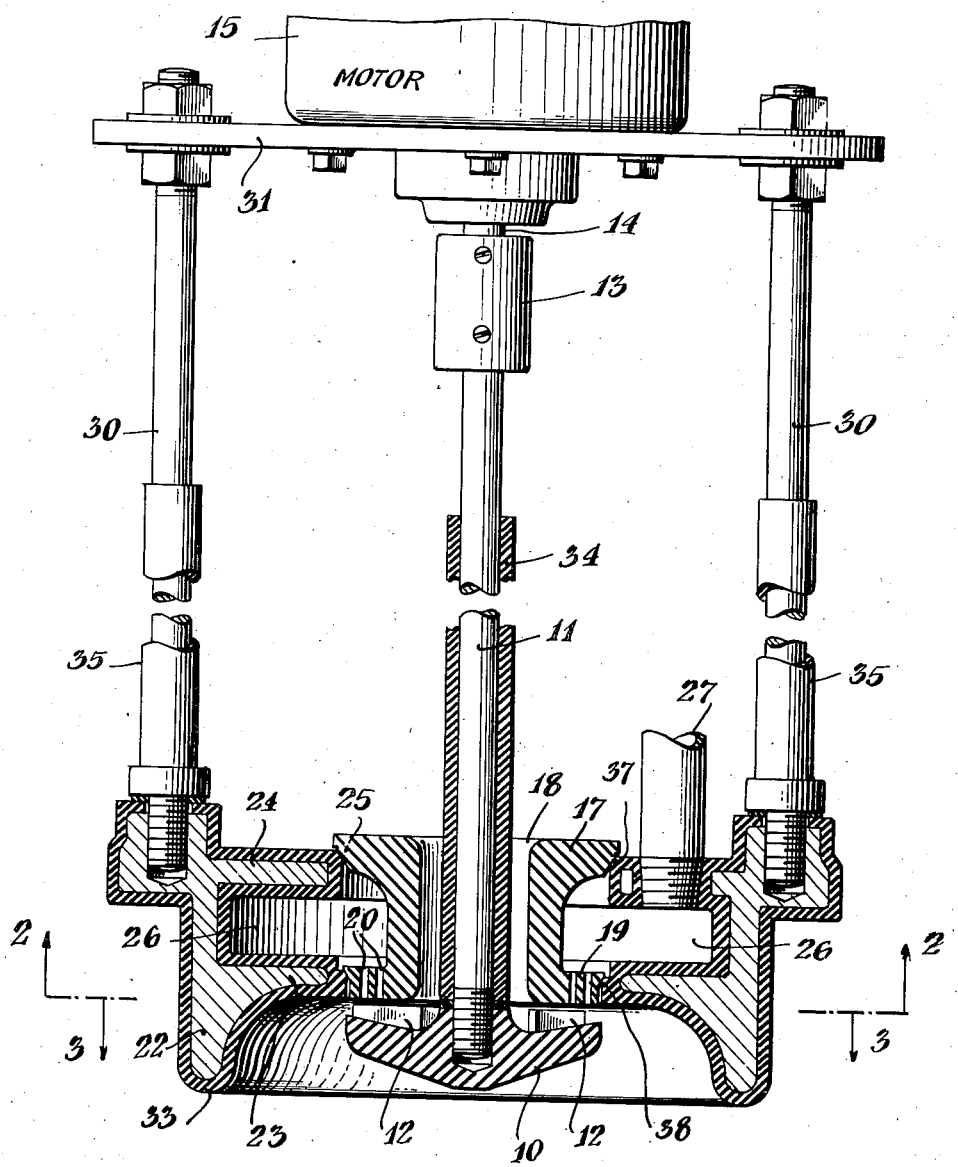
Figure 1 is an elevation of the device, with certain parts in vertical sections.
Figure 2:
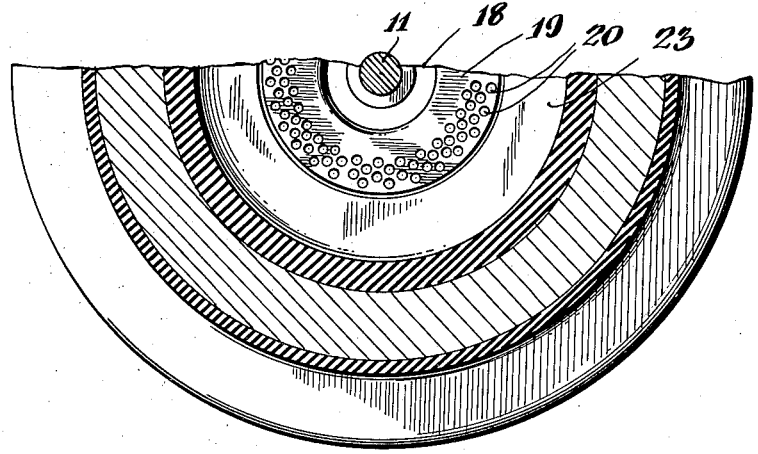
Fig. 2 is a fragmentary section on line 2—2 of Fig. 1.
Figure 3:
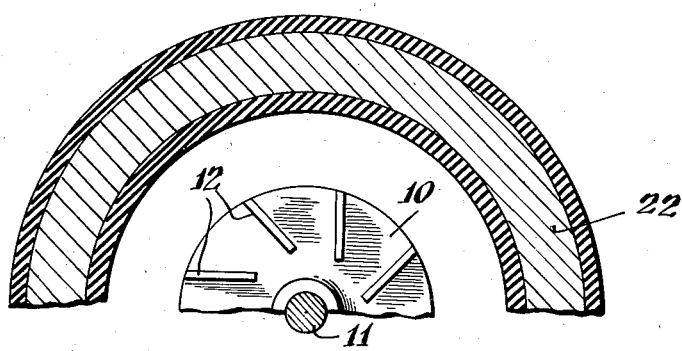
Fig. 3 is a fragmentary section on line 3—3 of Fig. 1.

Referring to Figs. 1, 2 and 3, the device includes a rotor or impeller, conveniently made of corrosion-resistant material and including a generally disk-shaped member 10, mounted on the end of a shaft 11 and preferably comprising a solid of revolution having curved and tapered configurations for its upper and lower surfaces, of the character shown. On its upper or concave surface the rotor member 10 is provided with a plurality of upstanding vanes or blades 12, disposed in a generally radial arrangement, but preferably off-set in planes parallel to the radii of the member 10, as shown in Fig. 3. The shaft 11 is conveniently connected at its upper end by a coupling unit 13 to the shaft 14 of a motor 15, or other suitable driving mechanism, for rotating the shaft 11 and the impeller at the desired rate of speed.

The shaft 11 is surrounded by a collar 17 providing an annular space 18 of substantial length about the shaft. The lower end of the collar 17 has an outwardly extending flange 19 provided with suitable apertures such as a multiplicity of holes 20; and the arrangement of the collar and shaft are conveniently such that the lower or outer surface of the flange 19 is disposed close to the upper edges of the blades 12, as shown; whereby the path of the latter is an annular plane figure underlying the perforations 20 and having its inner circumference adjacent and conveniently somewhat smaller than the adjacent circular end of the annular channel 18.

The apparatus includes a base member 22 of generally ring-shaped configuration and having a pair of inwardly extending annular flanges 23, 24. The flange 19 of the collar 17 seats into or against the inner periphery of the base flange 23 and the collar 17 also has an upper peripheral flange 25 which similarly engages the upper flange 24 of the base member—thus providing, as enclosed by the flanges of the collar and base, an annular gas chamber 26 to which treating gas may be supplied through a suitable pipe or conduit 27. The base member is conveniently mounted to a pair of vertical supporting rods 30, 30, which carry at their upper ends a plate or frame member 31 for convenient mounting and support of the motor 15. For use in procedures of the kind specifically described, the collar 17 may be made of suitable corrosion-resistant material, and the base member 22, shaft 11 and supporting rods 30 may similarly be encased in appropriate corrosion-resistant coverings or coatings 33, 34, 35, respectively. Although the structure is fundamentally capable of use in other positions, it is conveniently shown as intended for submergence vertically into a body of the liquid wherein gas diffusion and liquid circulation are desired. It will be understood that the corrosion-resistant coverings should extend to all portions of the device that might otherwise be exposed to attack by liquid, gas or incidental spray.

As will be seen, the device is conveniently such that it is self-contained and self-supported, i. e., if the base member 22 is rested in or on a suitable support below the surface of the liquid, the apparatus is ready for operation and needs no other support or mounting for any of its driving or operating parts.

In operation, the conduit 27 is connected to a suitable supply of gas to be introduced, and upon rotation of the shaft 11 and the impeller in a clockwise direction, as seen in Fig. 3, the liquid is drawn down through space 18 and is thrown out under the base member 22, past the apertures 20. As will now be understood, the quantity of liquid that will be passed through the device is determined by the size of the impeller 10—12 and its rate of rotation, as well as by the size of the collar space 18. Preferably the latter, i. e., the space 18, is suitably proportioned relative to the quantity of the liquid that is circulated through the device (by the operation of the impeller at its desired or intended speed) or conveniently in relation to the minimum quantity of such circulated liquid (i. e., in cases where the device may sometimes be operated at different rates) so that there is sufficient friction loss produced through the space 18 to provide a measurably reduced pressure at the impeller 10—12— e. g., a pressure somewhat less than atmospheric where the apparatus is submerged, for instance, into the upper part of a tank which is open to the air. By reason of the reduced pressure in the passing liquid as it reaches the holes 20 and by reason of the high velocity of the liquid as the impeller carries it past the holes, a partial vacuum is produced in the chamber 26. Assuming that the conduit 27 is connected to a supply of gas, the vacuum effectively draws the gas through the conduit into the chamber and out through the holes 20. As the suction thus pulls the gas through the holes, the blades 12 of the impeller cut the stream of gas into fine bubbles and diffuse it thoroughly throughout the liquid being circulated, i. e., the liquid thrown out by the impeller. As a result, the gas is continuously diffused into the liquid and by the same instrumentalities, the gas-treated liquid is continuously advanced for circulation.

As shown, the arrangement of the collar 22 is conveniently such that it may be readily lifted up around the shaft and out of place. To that end, the cooperating flange portions 24—25 and 23—19 are provided with downwardly and inwardly tapered meeting surfaces 37, 38, respectively, and the parts are so proportioned that the outside diameter of the flange 19 is no larger than will afford ready clearance through the annular opening provided by the inside edge of the upper base flange 24. Not only is it generally advantageous to provide in this fashion for ready disassembly of the parts (it being apparent that other elements of the structure may also be taken apart quite readily), but the removability of the collar 17 is of special utility when the device is used in a liquid or treating system which may contain suspended matter that would tend to clog small spaces. As will be seen, the impeller, the base, the collar and the holes of the flange 19 may all be readily cleaned when the collar 17 is lifted up.

Figure 4:
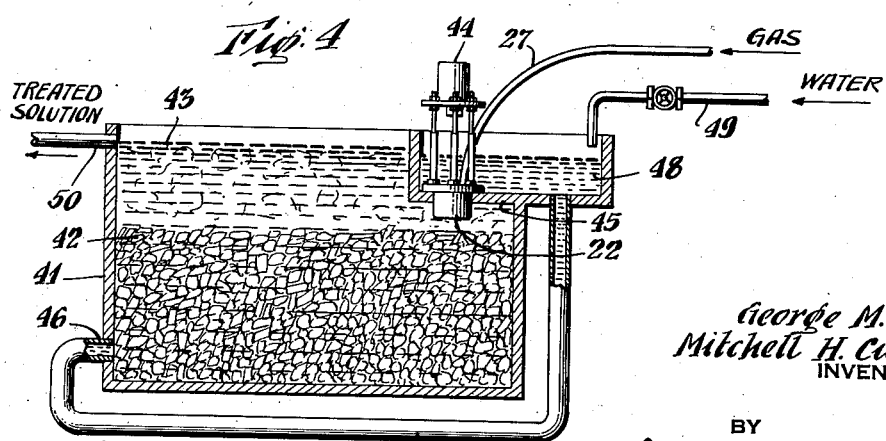
Fig. 4 is a view on reduced scale, generally in vertical section, showing the device of Figs. 1 to 3 as mounted and embodied in a system of the character stated, for the production of iron chloride.

Figure 4 shows a convenient arrangement of the device in a system such as that for producing iron chloride. Such a system may include a tank 41 substantially loaded with scrap iron 42 or the like, and containing liquid, e. g., water or aqueous solution, up to a suitable level 43. The diffusing and circulating device 44, which may be of the specific character shown in Figs. 1 to 3, inclusive, is conveniently seated in an aperture of a horizontal partition or wall 45, the wall 45 being conveniently the bottom of a suitable shallow tank 48 at the top of the main tank 41 as shown. It will be noted that the base 22 of the diffusing and circulating device extends through the wall 45, so that liquid drawn from above the wall is circulated down into the main body of liquid in the tank 41. From an outlet 46 near the bottom of the tank 41, a pipe 47 passes liquid back to the supplemental tank or compartment 48, i. e., above the wall 45, so that the circulation proceeds from the compartment 48, through the device 44, through the iron in the tank 41 and back through the pipe 47. If it is desired to operate the process continuously, water may be added constantly through the pipe 49, conveniently into the compartment 48, and the prepared iron chloride solution then overflows continuously through the pipe 50 and in a volume equal to that of the inflow of water. When the apparatus is thus operating continuously the strength of solution being produced and discharged at the pipe 50 is thus determined, in general, by the ratio of gas flow (through conduit 27) to the flow of water in through the pipe 49.

By way of specific example and although a wide variation of dimensions and proportions may be utilized depending on actual conditions of use (as will now be understood and as may be readily determined by those skilled in the art), the following are dimensions and other data relating to one form of apparatus of the character shown in the drawings, as the same has been designed for use in chlorination systems for the production of iron chlorides. Thus in one embodiment of the apparatus of Figs. 1 to 3, the collar 17 was made with an internal bore 2 15/32 inches long and 1¾ inches in diameter, and with a lower flange (19) 4⅛ inches in diameter and perforated with 120 holes 20 of 0.125 inch diameter. The outside diameter of the covered rotor shaft 11 (i. e., as encased in the material 34) was 31/32 inch and the impeller member 10 was set with eight of the blades 12, as shown, each 1⅛ inches long and having their upper edges elevated from the upper surface of the impeller member 10 by a distance of 3/32 inch on the outside and 1/32 inch at the inside, the clearance between the top of the blades and the underside of the flange 19 being 3/32 inch—such clearance being ordinarily as little as possible under the conditions of use of the apparatus. Operation of the device having the stated dimensions, at an impeller speed of about 1750 R. P. M., resulted in a chlorine gas pulling capacity (for operation of a vacuum type chlorinator connected to the conduit 27) of about 550 lbs. of chlorine per 24 hours.

It will now be seen that the arrangements shown and described amply and satisfactorily fulfill the stated objects of the invention. The apparatus is simple and efficient, affords a readily controllable means for diffusing the gas into the liquid and, at the same time, for circulating the liquid and particularly for circulating those portions of the liquid to which the gas has been freshly introduced. In addition, the device operates to produce a suitably substantial vacuum or reduced pressure, which is useful, for example, to effect the feed of gas for the diffusing operation—and notably to actuate a vacuum operated gas supply apparatus or the like. The device, moreover, may be of a relatively portable nature, particularly in that it is susceptible of ready removal or replacement; and the working parts are so arranged and constructed that they may be very easily separated or disassembled for cleaning or the like. In addition, the structure is such that there need be no bearings or other bearing surfaces beneath the surface of the liquid—a special advantage where the exposed parts are to be made of or coated with rubber or like corrosion-resistant material which cannot be applied at bearings or is otherwise unsatisfactory for bearing surfaces.

Ordinarily, the apparatus needs little or no adjustment or attention during operation, and indeed in arrangements of the sort shown in Fig. 4, the only regulation usually to be made is of the rate of gas feed (e. g., at the chlorinator, not shown), and of the rate of inflow of water through the pipe 49; by adjustment of those factors alone, both the strength of the treated solution and its rate of production and delivery through the pipe 50 may be readily controlled to suit the demand or to suit the best operating conditions for the chemical reaction involved.

Although the invention has been illustrated in reference to a specific kind of treatment for which it finds special utility, the various features and combinations disclosed may be applied to a wide variety of uses, as for producing a vacuum or negative pressure, or in operations wherein it is desired to diffuse a gas into a body of liquid and particularly wherein it is also desired to effect a circulation of the liquid—for instance, as in various oxidation procedures involving the introduction of air or oxygen into a liquid.

It is to be understood that the invention is not limited to the specific embodiments therein shown or described, but may be carried out in other ways without departure from its spirit as defined by the following claims.

We claim:

1. Apparatus adapted to be disposed in a body of liquid for diffusing gas into the liquid and for circulating the liquid, comprising base means having a passage therethrough and an enclosed annular cavity surrounding the passage, and impeller means including a drive shaft extending through the passage and carrying an impeller rotor adjacent the end of the passage, said rotor being adapted to draw liquid through the passage and to direct the same in a path adjacent the base means, and said base means including a multiplicity of small apertures opening from the cavity adjacent the impeller rotor, whereby advance of liquid by the impeller is adapted to draw gas from the cavity through said apertures.

2. The apparatus described in claim 1 wherein the base means includes a removable collar member providing the wall of the passage, and seating means for said collar member, whereby the latter may be displaced from and re-seated in the base means.

3. Apparatus for introducing gas into a liquid, comprising impeller means for moving liquid, base means for defining a path for the liquid moved by said impeller means, said base means including a gas-receiving chamber and having apertures in the walls thereof opening on the defined path, and said base means comprising a part having a central opening provided with an annular recess about the wall of same, and a collar member having a passage therethrough and removably seated in said opening, for enclosing the aforesaid recess to provide therewith the aforesaid chamber, said collar member being so disposed that the path defined by the base means includes the said passage through the collar member.

4. The apparatus of claim 3, which includes a container for the liquid to be treated, partitioning means in the container having an aperture therethrough, and means for returning liquid from one side of said partitioning means to the other, said impeller means and base means being disposed adjacent said aperture whereby the liquid is circulated by the impeller means from the second-mentioned to the first-mentioned side of the partitioning means.

5. Apparatus for introducing gas into a liquid, comprising means including a passage adapted to be submerged in the liquid, an impeller for drawing liquid through said passage and having associated means defining a path for liquid travel past said impeller, said impeller comprising impeller blades and means for moving same, and said associated means including a wall portion having a plurality of apertures therein and disposed to be swept on one side by said impeller blades, gas-handling means for delivering gas to the other side of said apertures, whereby liquid advanced by the impeller draws gas from the last-mentioned means through said apertures, said apertured wall portion being disposed immediately adjacent the impeller blades for positive comminution of the gas into fine bubbles by said blades as said gas escapes from the apertures.

6. Apparatus for introducing gas into a liquid, comprising a shaft, rotary impeller means mounted on said shaft and adapted to impel liquid in a direction radially outward from the shaft, means defining a liquid passage around said shaft and said impeller means, for the liquid advanced by the impeller means, said passage-defining means comprising a tubular portion closely surrounding said shaft for a substantial distance from said impeller means to a point remote therefrom, and a liquid-guiding surface portion extending radially outward from the tubular portion and immediately adjacent the impeller means to be swept thereby, and gas-handling means on the other side of the said surface portion, said surface portion being apertured to communicate with the gas-handling means; and said passage-defining means and said impeller means cooperating to reduce substantially the pressure of liquid drawn by the impeller means through the tubular portion and out past the apertures, for drawing gas through the latter into the liquid.

7. Apparatus for diffusing gas into a body of liquid, comprising an impeller device for moving liquid and including impeller vanes and means for moving the same, liquid-guiding means including tubular means extending to said device for defining a path through which liquid is drawn by said device, said tubular means being of restricted cross-sectional area and of substantial length for frictionally reducing the pressure of the passing liquid to a substantial extent, said liquid-guiding means extending adjacent the impeller device and having associated gas-feeding means, including aperture means disposed to be traversed by said vanes, whereby gas is drawn through said aperture means into the liquid advanced by the device, in response to the aforesaid reduced pressure of said liquid, and the gas is cut by said vanes substantially immediately upon its discharge from said aperture means.

8. Apparatus for diffusing gas into a body of liquid, comprising an impeller device adapted to be submerged in the liquid and including impeller vanes and means for moving the same, means for supporting and driving said device from a point spaced therefrom, whereby said device may be operated in the liquid without submergence of bearing surfaces therein, means adjacent to said device for defining a path for the liquid caused to move by said device, and means at said path-defining means including aperture means disposed to be traversed by said vanes, for admitting gas to the moving liquid, the discharge of said aperture means being closely adjacent the path of movement of said vanes, said supporting and driving means including a shaft adapted to extend from the device out of the liquid, and said path defining means including tubular means of restricted cross-section and substantial length, surrounding said shaft, for advance of liquid to the aperture means by the impeller device, whereby the liquid passing the aperture means has substantially reduced pressure and substantially high velocity.

9. Apparatus for diffusing gas into a body of liquid, comprising means including passage-defining means and impeller means to cause displacement of liquid through said passage-defining means, for creating a flow of liquid having a substantially reduced pressure therein, and means adjacent said passage defining means for admitting gas to said flow of liquid, whereby gas may be applied in accordance with said reduced pressure, said passage defining means extending about said impeller means and said gas admitting means comprising aperture means disposed to be traversed by said impeller means, and said aperture means being disposed immediately adjacent said impeller means at a region of maximum velocity of the liquid advanced by said impeller means.

10. Apparatus for diffusing gas into a body of liquid, comprising a rotary impeller device having a solid rotor portion and radial vanes mounted on a face of said portion to sweep an area transverse of the axis of rotation, tubular means defining a liquid path extending toward said vanes centrally thereof and a liquid-guiding surface which extends radially of said tubular means through the aforesaid area swept by the impeller vanes and which has gas supply apertures disposed in said surface at outer portions of said area, said tubular means having restricted cross-section area and substantial length for reducing the pressure of passing liquid by friction and increase of velocity and said liquid-guiding surface cooperating with said solid rotor portion to provide a restricted area through which the impeller vanes move the liquid with a velocity having both radial and tangential components, whereby gas is drawn through the apertures into the liquid at a place of high velocity and greatly reduced pressure of said liquid, and said vanes being disposed to sweep in close proximity to said apertured surface, for positively comminuting the entrained gas into fine bubbles.

11. Apparatus for introducing gas into a body of liquid, comprising a collar device defining a passage for liquid, a shaft extending through the said collar device, a rotary impeller mounted on said shaft adjacent one end of said collar device for drawing liquid through the latter, means for admitting gas to the liquid drawn through said device, means supporting said impeller independently of said collar, for rotation, and means removably mounting said collar device adjacent the impeller, whereby said device may be displaced along the shaft and away from the impeller to afford access to said device and impeller, said collar device having an apertured surface which extends in a radial direction with respect to the shaft and which is disposed to be swept by said impeller, and said gas admitting means comprising enclosure means adapted to abut said collar device on the other side thereof to form a gas supply chamber.

12. Apparatus for introducing gas into a body of liquid, comprising an impeller device, a driving member therefor carrying the device, means supporting said driving member at a place remote from the impeller device whereby the device may be operated within a body of liquid without submerging bearing surfaces in the liquid, means submergible with the device, for defining a restricted path for liquid caused to move by said device, whereby pressure is reduced in said moving liquid, and gas-admitting means comprising apertures in said path-defining means disposed at a path thereof where the pressure of the moving liquid is reduced, said impeller device being disposed in immediate proximity to the aforesaid part of the path-defining means for direct traversal of the apertures by the impeller device and immediate positive comminution, by said device, of gas bubbles drawn through the apertures into the liquid in response to the reduced pressure of the latter.

GEORGE MARTIN BOOTH.
MITCHELL HORACE CUBBERLEY.